April 7, 1931.  H. A. TUTTLE  1,799,264
REVERSING MECHANISM
Filed July 9, 1929  4 Sheets-Sheet 1
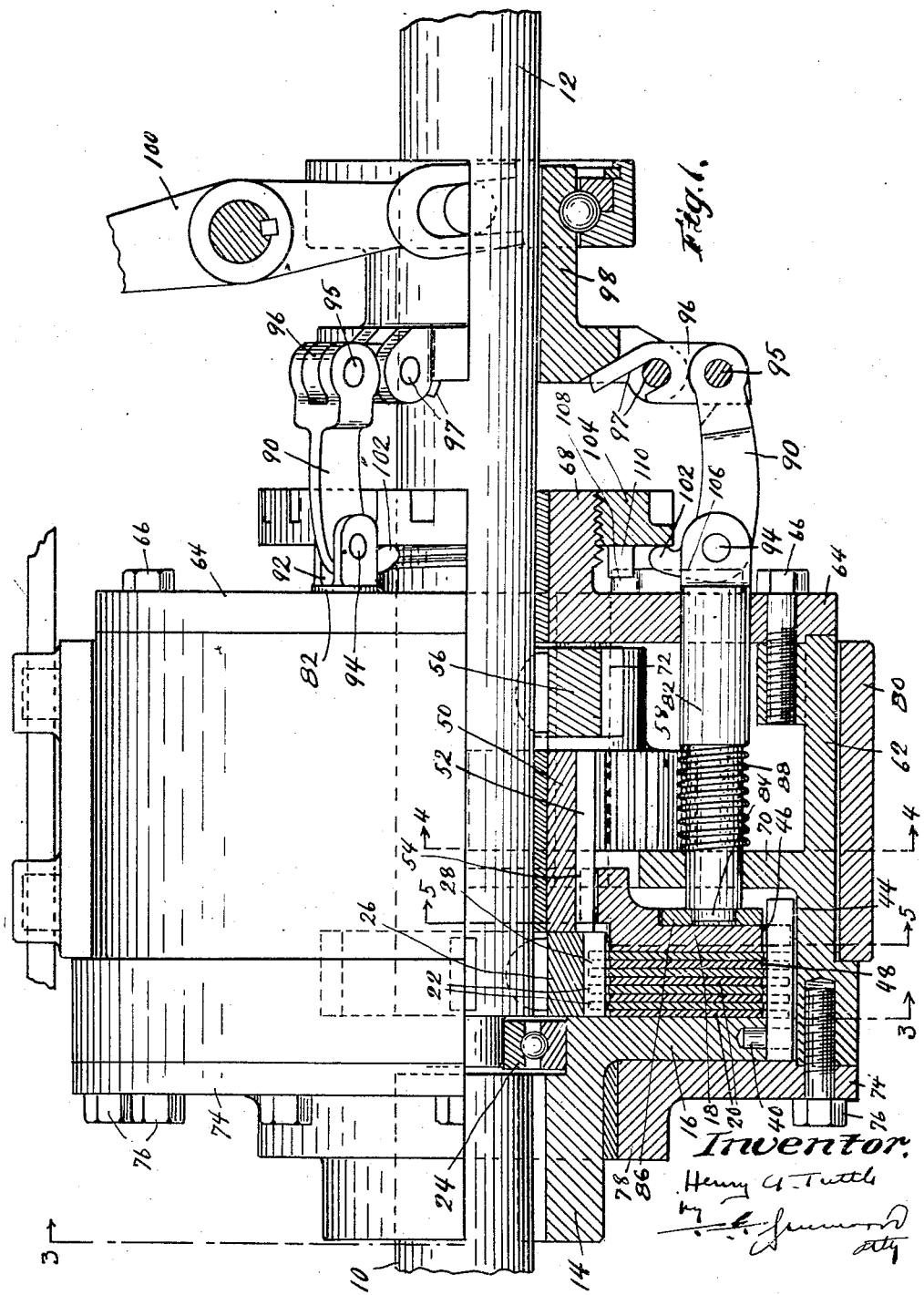

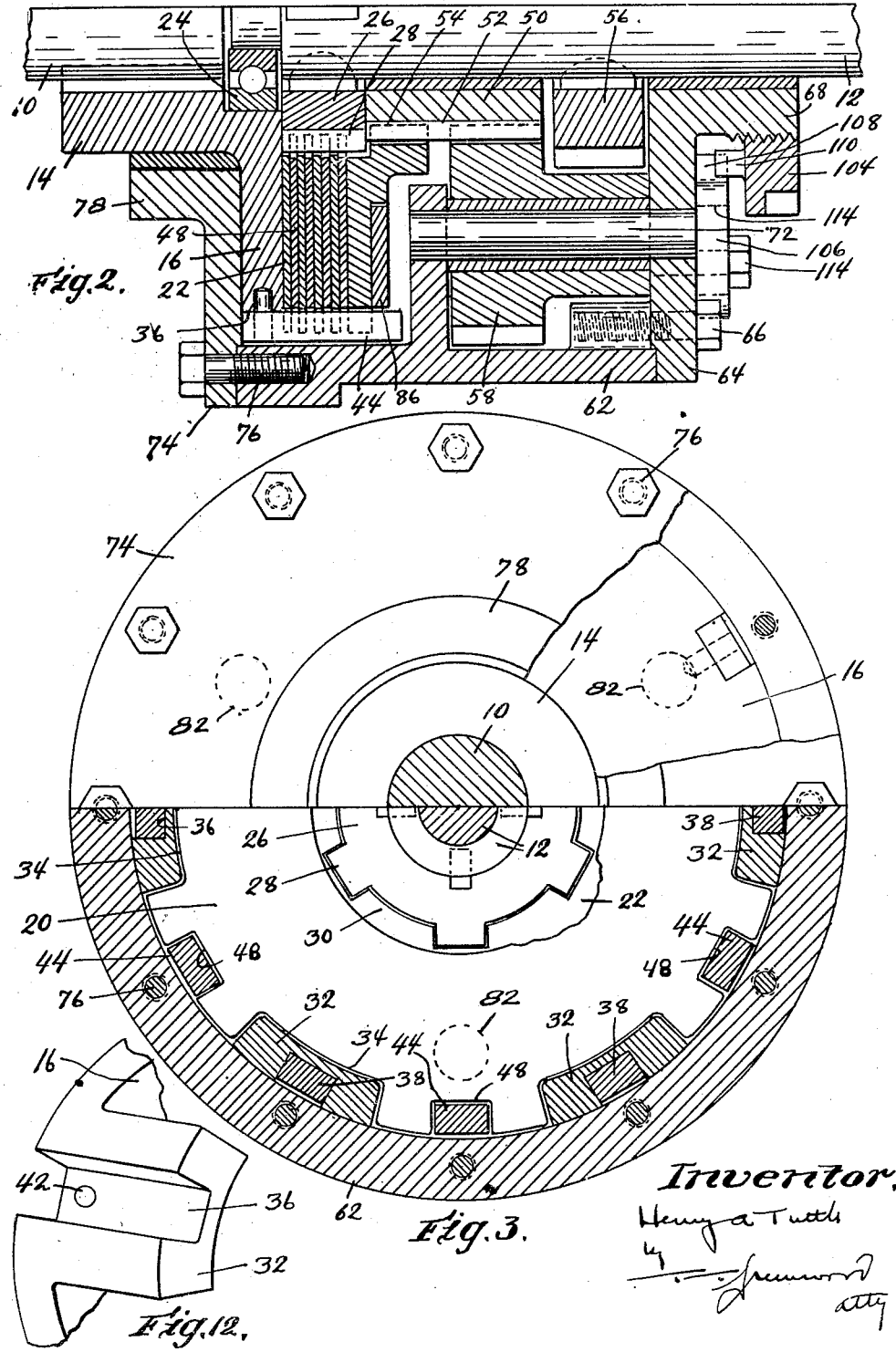

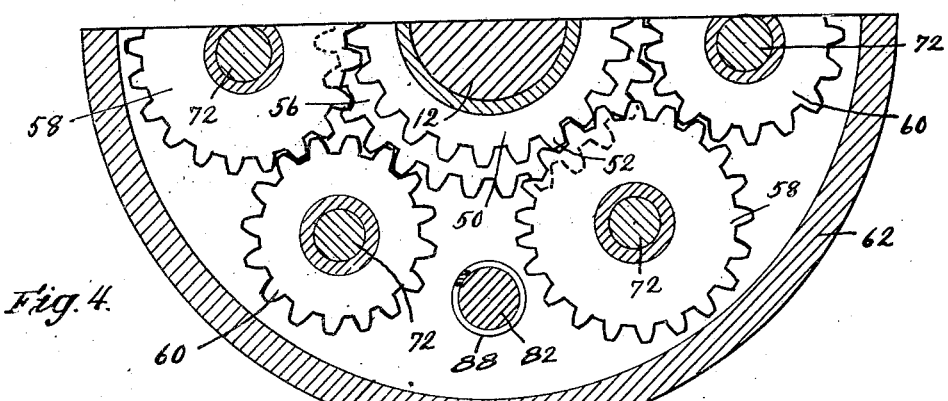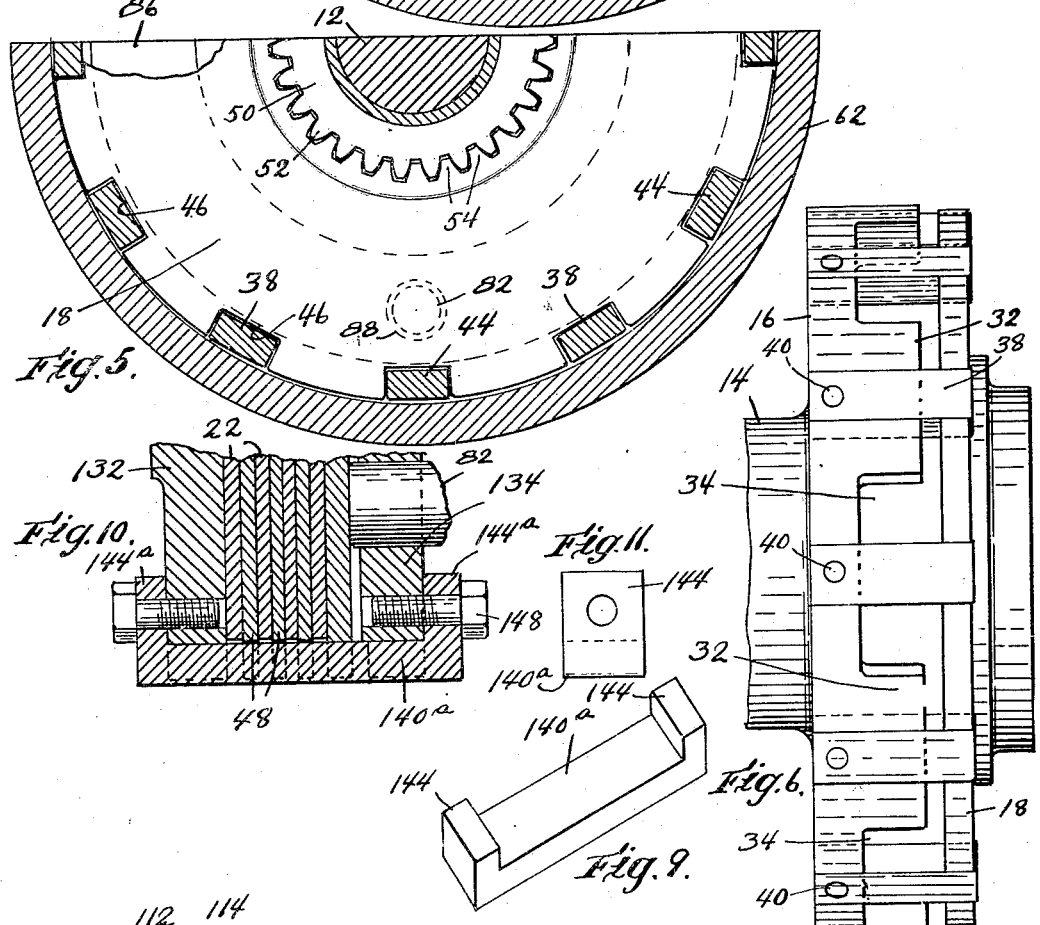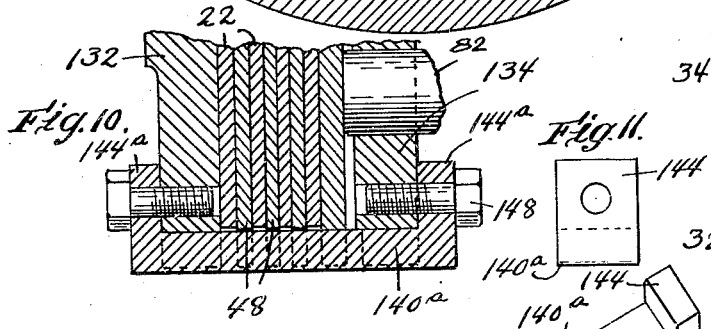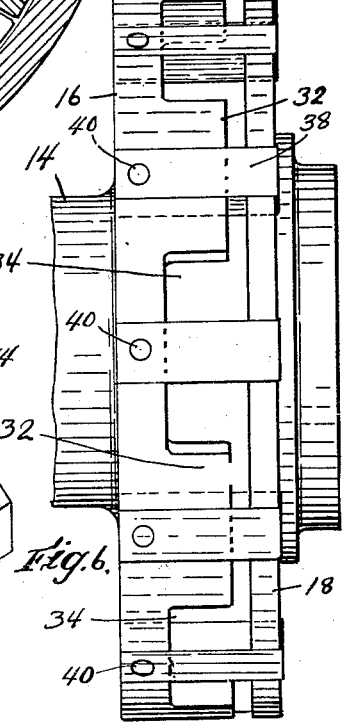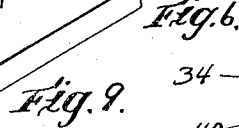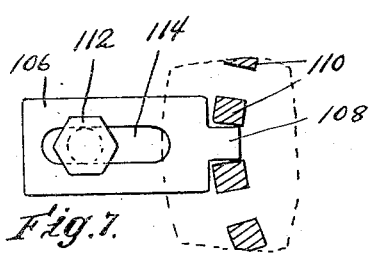

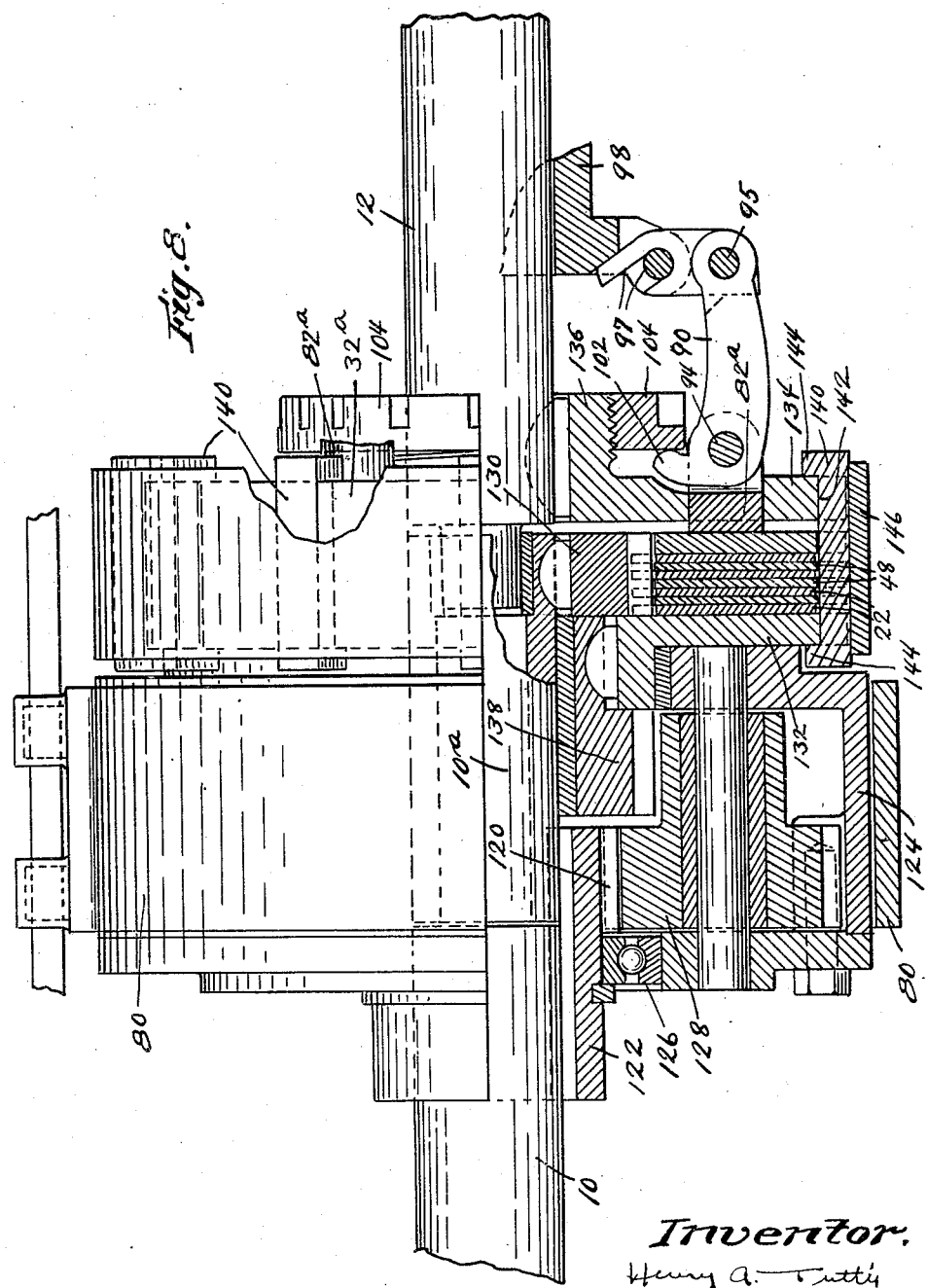

Patented Apr. 7, 1931

1,799,264

UNITED STATES PATENT OFFICE

HENRY A. TUTTLE, OF UPTON, MASSACHUSETTS; JENNIE L. TUTTLE EXECUTRIX OF SAID HENRY A. TUTTLE, DECEASED

REVERSING MECHANISM

Application filed July 9, 1929. Serial No. 377,046.

This invention relates to reversing mechanisms especially adapted for boat propulsion and having clutch mechanism for connecting the driving or engine shaft with the driven or propeller shaft for forward drive and planetary gearing for connecting the shafts for reverse drive.

One of the objects of the present invention is the provision of reversing mechanism having a novel construction wherein the driving and driven shafts are connected directly for forward drive and the planetary gearing is excluded.

Reversing mechanisms of the type to which this invention relates are called upon to transmit relatively large amounts of power and at the same time, are required to be compact so that the mechanism will occupy but a small space. The transmission of large amounts of power necessitates a clutch mechanism having a comparatively large area of engaging surfaces.

One of the objects of the present invention is in a clutch mechanism so arranged that the clutching area is increased over existing constructions without a corresponding increase in the dimensions of the reversing mechanism.

A further object of the invention is the provision of a clutch plate carrier having spaced walls between which the sets of clutch plates are located with one of the walls being movable with respect to the other wall while maintaining its driving connection therewith for the purpose of applying clutch-engaging pressure to the clutch plates.

It is a further object to provide a slidable driving connection between the movable wall of the clutch plate carrier and one of the driving gears of the planetary gearing mechanism.

A further object is the provision of reversing mechanism having a clutch mechanism which includes a clutch plate carrier having spaced walls which are structurally independent and are keyed together for conjoint rotation, the keying means also constituting driving means for one set of clutch plates.

A further object is generally to improve the construction and operation of reversing mechanisms.

Fig. 1 is a side elevation, partly in section, of a reversing mechanism embodying the present invention.

Fig. 2 is a sectional elevation similar to the lower half of Fig. 1, but taken in an angularly-displaced position to illustrate one of the planetary pinion gears.

Fig. 3 is a section taken along line 3—3 of Fig. 1.

Fig. 4 is a section taken along line 4—4 of Fig. 1.

Fig. 5 is a section along line 5—5 of Fig. 1.

Fig. 6 is a side elevation of the clutch plate carrier.

Fig. 7 is a detail of the locking means for the clutch adjusting ring.

Fig. 8 is a modified form of reversing mechanism and in particular illustrating a modified construction of the keying means between the walls of the clutch plate carrier.

Fig. 9 is a perspective view of one of the keys of Fig. 8.

Fig. 10 is a sectional detail illustrating a further modified form of key.

Fig. 11 is an end view of the key of Fig. 10.

Fig. 12 is a perspective detail of one of the driving lugs of the front wall of the clutch plate carrier of Fig. 6.

The reversing mechanism illustrated in Fig. 1 includes the driving or engine shaft 10 and the driven or propeller shaft 12, said shafts being axially aligned.

The clutch mechanism which connects the shafts directly for forward drive includes a clutch plate carrier having a hub 14 that is keyed to the end of the driving shaft and has a radially outstanding front plate or wall 16. The clutch plate carrier also includes the radially outstanding rear plate or wall 18 which is spaced axially from the front wall 16 to provide a compartment between them in which interspersed sets of clutch plates 20 and 22 are located. The forward end of the driven shaft 12 is received in an anti-friction pilot bearing 24 located in an enlarged recess in the hub 14 at the rear end of the driving shaft. A clutch plate supporting ring 26 is keyed to the driven shaft within the clutch plate compartment and has a plurality of axial splines or keys 28 that mesh with corresponding splines or keys 30 of the set of clutch plates 22, whereby to establish an axially-slidable driving connection therewith. The driving or front wall 16 of the clutch plate carrier, see especially Fig. 6, is provided with a plurality of peripherally-spaced, axially-rearwardly extended driving lugs 32 having peripherally spaced recesses 34 between them. Said lugs have axial recesses 36 in the peripheries thereof in which keys 38 are located and are secured in place by pins 40 which are driven into the forward ends of said keys and into recesses 42, see especially Fig. 12, in the peripheral portion of the wall 16. The peripheral portion of said wall 16 between said lugs is also provided with recesses in which other keys 44 are located and are secured to said front wall by similar pins 40. Said keys are herein shown as rectangular in cross-section and are received within corresponding recesses in the walls 16 and lugs 32 so that the keys cannot rotate about the securing pins 40. Said keys are extended rearwardly parallel to the axes of the driving and driven shafts and are received freely within similar grooves or recesses 46 formed in the periphery of the rear wall 18. With this arrangement, the rear wall 18 is maintained in driving engagement with the front wall 16 and is constrained to rotate conjointly therewith although it is free for independent axial movement, the wall, during such movement, sliding in driving engagement with the keys 38 and 44. The keys 38 are utilized mainly to establish the driving connections between the two walls; and the lugs 32 are terminated close to said rear wall so as to provide a strong and rigid support for the driving keys 38. The keys 44 constitute means to establish a driving connection between the two walls of the clutch plate carrier and the set of clutch plates 20 keyed thereby. To this end, the peripheries of said clutch plates are provided with axially-arranged square recesses or slots 48 in which said keys 44 are freely received and which conform to the configuration of said keys. Thus, the clutch plates are keyed to both walls of the clutch plate carrier and are, at the same time, free to move axially. The rear wall 18 of the clutch plate carrier is adapted to be moved forwardly to move the clutch plates into engagement whereby to set the clutch mechanism and connect the driving and driven shafts directly for forward drive. The means for moving said rear wall 18 will be described hereinafter.

Said rear wall 18 is keyed to and is axially slidable on a spur gear 50 which is journalled on the driven shaft immediately in the rear of the clutch plate carrying ring 26. Said gear constitutes one of the elements of the planetary reversing gearing that connects the driving and driven shafts for reverse drive. Said gear is provided with spur gear teeth 52 and said wall 18 is provided with internal gear teeth 54 which intermesh with the spur gear teeth 52 so that the wall 18 is supported by and is in driving connection with the gear 50 while it is, at the same time, free to move in an axial direction on said gear.

The planetary gearing includes the aforesaid gear 50 and a driven spur gear 56 that is of larger diameter than the spur gear 50 and is fixed to the driven shaft 12 immediately in the rear of said gear 50. Planetary pinion gears connect said two spur gears and include large pinion gears 58 which mesh with the spur gear 50 and also mesh with small pinion gears 60, which latter gears mesh with the spur gear 56. Said pinion gears are carried by a rotatable pinion gear carrier which includes the cylindrical wall or drum 62 that surrounds the aforesaid gears and has a forward extension that overlies the clutch plate carrier. The open rear end of the drum 62 is closed by a rear wall or cover plate 64 that is secured to said drum by bolts 66 and has a rearwardly extended hub 68 that is journalled on the driven shaft 12. The cylindrical wall or drum 62 has a radially inwardly extended flange 70 intermediate its ends which is disposed between the clutch plate carrier and the pinion gears. The pinion gears are rotatably supported on pins 72 which are carried by the rear end wall 64 and the flange 70. The forward end of the drum 62 is closed by a front cover plate 74 which is secured thereto by bolts 76 and overlies and is adapted to have a clutching engagement with the front face of the wall 16 of the clutch plate carrier when the clutch mechanism is set for forward drive, and has a hub 78 which is journalled on the hub 14 of said clutch plate carrier.

Brake mechanism is provided to set the reversing gearing for reverse drive and includes a brake band 80 that encircles the drum 62 and is adapted to be contracted into holding engagement therewith in the usual manner, whereby to hold the pinion gear carrier stationary and effect the reverse drive of the driven shaft.

The clutch mechanism is operated by clutch operating mechanism that includes thrust pins 82 that are slidably extended axially within and are carried by the wall 64 and flange 70 of the pinion gear carrier. Said thrust pins have reduced forward ends 84 which are received in recesses in a thrust ring 86 that bears frictionally against the rear face of the movable wall 18 of the clutch plate carrier. When said thrust pins are moved forwardly they operate to press said ring against said wall 18 and thereby to move said wall forwardly into pressure-applying relation with the clutch plates, thereby to set the clutch for forward drive.

Compression springs 88 encircle said thrust pins and bear against abutments thereof and also against the flange 70, whereby to move said pins rearwardly in clutch-releasing direction when the clutch-engaging pressure on said pins is removed.

Said pins are provided with operating mechanism including links 90 which are located within slots 92 formed in the ends of said pins and are pivoted thereto by pins 94. Said links 90 are pivoted at 95 to toggle links 96 which have pin and slot connections 97 with a sleeve 98 that is slidable on the driven shaft 12 and is moved forwardly and rearwardly thereon by means including the operating lever 100 to set the clutch and gearing mechanisms. Said links 90 are provided with inwardly directed toes 102 which fulcrum upon the front face of a thrust collar 104 that is adjustably screw-threaded on the hub 68 of the pinion gear carrier. Thus, by moving said sleeve 98 rearwardly, said links 90 are caused to bear upon the collar 104 and move said thrust pins 82 forwardly in a clutch setting direction. The collar 104 can be rotated on its screw-threaded connection with the hub 68 for the purpose of maintaining the proper adjustment of the operating mechanism as wear occurs between the clutch plates. Said collar is held in any adjusted position by a plate 106, see especially Fig. 7, that has a projection 108 which is releasably located between axial projections 110 of the collar, and is clamped releasably in the aforesaid position by a bolt 112 which passes through an elongated slot 114 in said plate and is screw threaded in the rear wall 64 of the pinion gear carrier. The projections 108 and 110 have such configuration that the plate 106 acts as a key to prevent rotation of the collar.

It will be noted that, as the clutch operating mechanism is operated to set the clutch, the planetary gearing carrier is moved rearwardly at the same time the thrust pins 82 are moved forwardly. Thus, the front wall 74 of the pinion gear carrier is moved into clutching engagement with the front wall 16 of the clutch plate carrier. The frictional engagement between the aforesaid parts not only increases the driving connection between shafts for forward drive but, at the same time, holds the various gears in set condition so that they cannot chatter and thereby damage their teeth during forward drive. The thrust ring 86, which is carried by the thrust pins, also acts as a clutch member to the same end.

In the modification shown in Fig. 8, the relative positions of the planetary gearing mechanism and the clutch mechanism are reversed from that illustrated in Fig. 1. In this construction, the driving spur gear 120 has a hub 122 which is keyed to the driving shaft 10. A planetary gear carrier 124 has its front wall rotatably supported by an anti-friction bearing 126 on said hub forwardly of the spur gear and has its pinion gears 128 meshing with said spur gear. Said driving shaft 10 has an extension, here shown as a short shaft 10a, which is located within and is keyed to the hub 122 and which extends to the clutch plate carrier and has a clutch plate supporting hub 130 at the rear end thereof which hub is located within the clutch plate compartment of said carrier. Said clutch plate carrier has a front wall 132 and, spaced therefrom, a rear wall 134 which has a hub 136 keyed to the driven shaft 12. A spur gear 138 is received within an axial recess in the front wall 132 and is keyed to said wall and is journalled on the short shaft 10a and extends forwardly into said pinion gear carrier and is in mesh with the small pinon gears thereof.

In this construction, the wall 132 of the clutch plate carrier is not movable axially with respect to the other wall of the carrier but is fixed thereto by keys 140 which are received within peripheral slots 142 of both walls in a manner similar to the construction illustrated in connection with Fig. 1. Said keys, however, have radially inwardly extended end-projections 144 which overlie the front and rear faces respectively of said walls and serve to hold said front wall 132 against the front faces of the forwardly extended lugs 32a of the rear wall 134. Said keys 140 are retained in place by a retaining ring 146 which encircles the peripheral portions of said walls 132 and 134 and encloses said keys and retains them in the aforesaid position. In this construction, the clutch plates are pressed together by thrust pins 82a which are carried by and are slidable axially within the rear wall 134 and are operated by link mechanism which may be identical with that above described. The retaining ring also serves to retain oil within the clutch plate carrier and, by its use, permits an increased diameter of the carrier and the clutch plates since, by the use of the ring, it is not necessary to enclose the carrier within the enclosing drum of the pinion gear carrier.

In the modification shown in Fig. 10, the keys 140a have bolts 148 which are passed through the extensions 144a and are screw threaded into end walls 132 and 134 of the clutch plate carrier whereby to hold the keys to the carrier and the carrier plates in spaced driving connection. The clutch plates are provided with recesses as above described in which said keys 140a are received, whereby to establish driving connection between said plates and the carrier.

I claim:

1. Reversing mechanism having the combination of aligned driving and driven shafts, planetary gearing connecting said shafts for reverse drive, and clutch mechanism connecting said shafts for forward drive including a clutch plate carrier driven by one of said shafts and having spaced walls which have aligned key slots in their peripheries, keys received in said slots constituting the driving connection between said walls, and cooperative sets of clutch plates located within said carrier, one set having a driving connection with said carrier and the other set having a driving connection with said other shaft.

2. Reversing mechanism including the combination of aligned driving and driven shafts, planetary gearing connecting said shafts for reverse drive, and clutch mechanism for connecting said shafts for forward drive including a clutch plate carrier driven by one of said shafts, said carrier including axially spaced independent front and rear walls having aligned key slots in their outer peripheries, keys extended between said walls and located in said slots and constituting the driving connection between said walls, means securing said keys in the aforesaid relation, and cooperative sets of clutch plates located between said walls, one set having a driving connection with some of said keys and the other set having a driving connection with said other shaft.

3. Reversing mechanism including the combination of aligned driving and driven shafts, planetary gearing connecting said shafts for reverse drive, clutch mechanism connecting said shafts for forward drive including a clutch plate carrier driven by one of said shafts, said clutch plate carrier having axially spaced front and rear walls having aligned key slots in their peripheries, keys extended between said walls and located in said slots and constituting the driving connection between said walls, means securing the keys positively to one of said walls only, and cooperative sets of clutch plates located within said walls, one set having a driving connection with some of said keys and the other set having a driving connection with the other one of said shafts.

4. Reversing mechanism including the combination of aligned driving and driven shafts, planetary gearing connecting said shafts for reverse drive, and clutch mechanism connecting said shafts for forward drive including a clutch plate carrier having axially spaced front and rear walls, said front wall having peripherally-spaced rearwardly-extended lugs which are located in the space between said walls, said front wall and said lugs having axially extended slots in the peripheral portions thereof and said rear wall having similar slots which are aligned with the aforesaid slots, keys received in said slots constituting the driving connection between said walls, and cooperative sets of clutch plates located between said walls one set having a driving connection with said walls and the other set having a driving connection with said driven shaft.

5. Reversing mechanism including the combination of aligned driving and driven shafts, planetary gearing connecting said shafts for reverse drive, and clutch mechanism connecting said shafts for forward drive including a clutch plate carrier having axially spaced front and rear walls, said front wall having peripherally-spaced rearwardly-extended lugs which are located in the space between said walls, said front wall and said lugs having axially extended slots in the peripheral portions thereof and said rear wall having similar slots which are aligned with the aforesaid slots, keys received in said slots constituting the driving connection between said walls, other keys extended between and received in slots in said walls between said first mentioned keys, and cooperative sets of clutch plates located between said walls, one set being engaged with said last named keys and said other set having a driving connection with said driven shaft.

6. Reversing mechanism including the combination of aligned driving and driven shafts, planetary gearing connecting said shafts for reverse drive, and clutch mechanism connecting said shafts for forward drive including a clutch plate carrier driven by one of said shafts having axially spaced front and rear walls which rotate together, and clutch plates located within said carrier some of which have a driving connection with said carrier and others of which have a driving connection with said other shaft, said rear wall having a driving connection with said front wall and being axially movable in such driving relation to press said clutch plates against said front wall, and clutch operating mechanism having means which applies a clutching pressure upon said plates and an oppositely directed pressure upon said front wall.

7. Reversing mechanism including the combination of driving and driven shafts, planetary gearing connecting said shafts for reverse drive, clutch mechanism connecting said shafts for forward drive including a clutch plate carrier driven by said driving shaft, said carrier having axially spaced front and rear walls which rotate together, means establishing a driving connection between said walls admitting of an axial movement of said rear wall, and clutch plates located between said walls, some of which have a driving connection therewith and others of which have a driving connection with said driven shaft, and means to move said rear wall axially to press said clutch plates against said front wall and at the same time to apply an oppositely directed pressure upon said front wall.

8. Reversing mechanism including the combination of driving and driven shafts, gearing connecting said shafts for reverse drive, and clutch mechanism connecting said shafts for forward drive including a clutch plate carrier having axially spaced front and rear walls which rotate together, means providing a driving connection between said walls including keys which are located in recesses in and fixed to and are spaced peripherally about said front wall on which said rear wall is slidable, clutch plates located between said walls some of which have a driving connection with said carrier and others of which have a driving connection with said driven shaft, and means to move said rear wall axially on said keys to press said clutch plates against said front wall.

9. Reversing mechanism including the combination of driving and driven shafts, gearing connecting said shafts for reverse drive, and clutch mechanism connecting said shafts for forward drive including a clutch plate carrier having axially spaced front and rear walls which rotate together, peripherally spaced keys carried by and fixed in recesses of said front wall and extended rearwardly and received freely in slots in the periphery of said rear wall, whereby said rear wall is maintained in driving connection with and is free for axial movement independently of said front wall, clutch plates located between said walls some of which have a driving connection with some of said keys and others of which have a driving connection with said driven shaft, and means to move said rear wall axially to press said clutch plates against said front wall and at the same time to apply an oppositely directed pressure upon said front wall.

10. Reversing mechanism including the combination of driving and driven shafts, gearing connecting said shafts for reverse drive, and clutch mechanism connecting said shafts for forward drive, including a clutch plate carrier having axially spaced front and rear walls, said front wall having a driving connection with said driving shaft and having peripherally-spaced rearwardly-extended lugs which have axially-extended peripheral slots therein, said rear wall having peripheral slots which are aligned with the aforesaid slots, keys received in said lugs and rear wall, on which keys said rear wall is axially movable, means securing said keys to said front wall, other peripherally-spaced keys connected with and extended between said walls, clutch plates located between said walls some of which have peripheral slots therein which surround said last-named keys and establish a driving connection with said driven shaft, and means to move said rear wall axially into pressure-applying relation with said clutch plates.

11. Reversing mechanism including the combination of driving and driven shafts, planetary gearing connecting said shafts for reverse drive including a spur gear, planetary pinion gears in mesh with said spur gear, and clutch mechanism connecting said shafts for forward drive including a clutch plate carrier driven by one of said shafts having axially-spaced front and rear walls which rotate together, cooperative sets of clutch plates located between said walls, one set having a driving engagement with said carrier and the other set having a driving engagement with said other shaft, said rear wall having axially movable driving connection with said front wall and with said spur gear, and means to move said rear wall axially to press said clutch plates against said front wall.

12. Reversing mechanism including the combination of driving and driven shafts, planetary gearing connecting said shafts including a spur gear, planetary pinion gears meshing with said spur gear, and clutch mechanism connecting said shafts for forward drive including a clutch plate carrier having a front wall connected with said driving shaft and having a rear wall spaced from said front wall, means establishing a driving connection between said walls on which connection said rear wall is free for axial movement, means establishing a driving connection between said rear wall and said spur gear on which connection said rear wall also is free for axial movement, sets of clutch plates located between said walls, one set having a driving connection with both of said walls, and the other set having a driving connection with said driven shaft, and means to move said rear wall axially to press said clutch plates against said front wall.

13. Reversing mechanism including the combination of driving and driven shafts, planetary gearing connecting said shafts for reverse drive including a spur gear, planetary pinion gears meshing with said spur gear, and clutch mechanism connecting said shafts for forward drive including a clutch plate carrier having a front wall connected with said driving shaft and having a rear wall axially spaced therefrom, peripherally-spaced keys extended between said walls fixed to said front wall and freely located in slots in said rear wall on which keys said rear wall is axially movable, said rear wall having a toothed and axially movable driving connection with said spur gear, sets of clutch plates located between said walls, one set having a driving engagement with some of said keys, the other set having a driving engagement with said driven shaft, and means to move said rear wall axially into pressure-applying relation with said clutch plates.

14. Reversing mechanism including the combination of driving and driven shafts, planetary gearing connecting said shafts for reverse drive including a spur gear, planetary pinion gears meshing with said spur gear, a rotatably loose carrier for said pinion gears and clutch mechanism connecting said shafts for forward drive including a clutch plate carrier having a front wall that is connected with said driving shaft and, spaced from said front wall, a rear wall which rotates with said front wall, means providing a driving connection between said walls which admits of an axial movement of said rear wall, said rear wall having a driving connection with said spur gear, sets of clutch plates located between said walls, one set having a driving connection with said carrier and the other set having a driving connection with said driven shaft, and means extended loosely through said pinion gear carrier to move said rear wall axially to press said clutch plates against said front wall.

15. Reversing mechanism including the combination of driving and driven shafts, planetary gearing connecting said shafts for reverse drive including a spur gear, planetary pinion gears meshing with said spur gear, and clutch mechanism connecting said shafts for forward drive including a clutch plate carrier connected with said driving shaft, and having a front wall, sets of clutch plates located in the rear of said wall and having driving connections respectively with said carrier and with said driven shaft, a pressure plate disposed in the rear of said clutch plates and having a driving connection with said spur gear and being movable axially with respect to said spur gear and means to move said pressure plate axially to press said clutch plates against said front wall.

16. Reversing mechanism including the combination of driving and driven shafts, planetary gearing connecting said shafts for reverse drive including a spur gear, planetary pinion gears meshing with said spur gear, a carrier for said pinion gears, and clutch mechanism connecting said shafts for forward drive including a clutch plate carrier connected with said driving shaft, sets of clutch plates having driving connections respectively with said carrier and with said driven shaft, a pressure-plate having an axially movable driving connection with said spur gear, and means to move said pressure plate axially into pressure-applying relation with said clutch plates independently of a corresponding movement of said pinion gear carrier.

17. Reversing mechanism including the combination of driving and driven shafts, clutch mechanism connecting said shafts for forward drive including a clutch plate carrier having axially spaced front and rear walls, said front wall having a driving connection with said driving shaft, said rear wall having a peripheral driving connection with said front wall and being axially movable while maintaining said driving connection, sets of clutch plates located between said walls having driving connections respectively with said carrier and with said driven shaft, planetary gearing including a spur gear having an axially movable driving connection with said rear wall of said clutch plate carrier, planetary pinion gears meshing with said spur gear, a pinion gear carrier located in the rear of said clutch plate carrier, and clutch operating mechanism located in the rear of said pinion gear carrier having means that are carried by and are extended through said pinion gear carrier and are movable independently of said carrier into engagement with said axially movable rear wall of said clutch plate carrier to move it axially to press said clutch plates against said front wall.

18. Reversing mechanism including the combination of driving and driven shafts, axially fixed planetary gearing connecting said shafts for reverse driving, clutch mechanism connecting said shafts directly for forward drive and excluding said planetary gearing, and clutch-operating means which is extended through said planetary gearing and is axially movable independently of said planetary gearing to set said clutch mechanism.

19. Reversing mechanism including the combination of driving and driven shafts, planetary gearing connecting said shafts for reverse drive including driving and driven spur gears connected respectively with said driving and driven shafts, planetary pinion gears meshing with said spur gears, a rotatable carrier for said pinion gears, clutch mechanism connecting said shafts directly for forward drive and excluding said gearing including sets of clutch plates having driving connections respectively with said driving and driven shafts, and clutching means operable with said clutch mechanism to clutch said pinion gear carrier with one of said shafts independently of said clutch plates.

20. Reversing mechanism including the combination of driving and driven shafts, planetary gearing connecting said shafts for reverse drive including a rotatable pinion gear carrier, clutch mechanism connecting said shafts for forward drive including a clutch plate carrier having a driving connection with one of said shafts, and means providing a clutching and power-transmitting engagement between said two carriers.

21. Reversing mechanism including the combination of driving and driven shafts, planetary gearing connecting said shafts for reverse drive including spur gears connected with said driving and driven shafts respectively, planetary pinion gears meshing with said spur gears, a rotatable and axially movable pinion gear carrier, clutch mechanism connecting said shafts directly for forward drive and excluding said gearing including cooperative sets of clutch plates having driving connections respectively with said shafts, clutch means connecting said pinion gear carrier with one of said shafts, and clutch operating mechanism arranged to move said pinion gear carrier axially to set said clutch mechanism and also said clutch means.

22. Reversing mechanism including the combination of driving and driven shafts, planetary gearing connecting said shafts for reverse drive including spur gears connected respectively with said driving and driven shafts, planetary pinion gears meshing with said spur gears, a carrier for said pinion gears, clutch mechanism connecting said shafts directly for forward drive and excluding said gearing including a clutch plate carrier driven by said driving shaft, clutch plates having driving connections respectively with said carrier and with said driven shaft, and clutch means operable with said clutch mechanism for connecting said clutch plate carrier to said pinion gear carrier.

23. Reversing mechanism including the combination of driving and driven shafts, planetary gearing connecting said shafts for reverse drive including spur gears connected respectively with said driving and driven shafts, planetary pinion gears meshing with said spur gears, a rotatable and axially movable carrier for said pinion gears, clutch mechanism connecting said shafts directly for forward drive and excluding said gearing including a clutch plate carrier having a wall which is driven by said driving shaft, clutch plates having a driving connection with said carrier, cooperating clutch plates having a driving connection with said driven shaft, said pinion gear carrier having a wall which overlies said wall of said clutch plate carrier and is movable into clutching engagement therewith, and clutch operating mechanism including means to apply clutching pressure to said clutch plates and also to move said pinion gear carrier axially to effect clutching engagement of said walls.

24. Reversing mechanism including the combination of driving and driven shafts, planetary gearing connecting said shafts for reverse drive including spur gears connected respectively with said driving and driven shafts, planetary pinion gears meshing with said spur gears, a rotatable and axially movable carrier for said pinion gears, clutch mechanism connecting said shafts directly for forward drive and excluding said gearing including a clutch plate carrier, a set of clutch plates carried thereby, a second and cooperating set of clutch plates having a driving connection with said driven shaft, said clutch plate carrier also having a clutching surface, and said pinion gear carrier having a cooperating clutching surface, and clutch operating mechanism including means to apply a clutch-engaging pressure to said clutch plates and also to move said pinion gear carrier axially to effect the engagement of said clutching surfaces.

25. Reversing mechanism including the combination of driving and driven shafts, clutch mechanism connecting said shafts for forward drive including a clutch plate carrier having axially spaced front and rear walls, said front wall having a driving connection with said driving shaft and said rear wall having a driving connection with said front wall and being axially movable while maintaining said driving connection, sets of cooperative clutch plates carried by said carrier and by said driven shaft respectively, a pressure plate bearing upon but free from positive connection with said movable rear wall, and clutch operating mechanism including means to apply pressure upon said pressure plate to move said wall axially into pressure-applying engagement with said clutch plates.

26. Reversing mechanism including the combination of driving and driven shafts, clutch mechanism connecting said shafts for forward drive including a clutch plate carrier having axially spaced front and rear walls, said front wall having a driving connection with said driving shaft and said rear wall having a driving connection with said front wall and being axially movable while maintaining said driving connection, sets of cooperative clutch plates carried by said carrier and by said driven shaft respectively, planetary gearing connecting said shafts for reverse drive including a spur gear connected with said movable wall, a second spur gear fixed to said driven shaft, planetary pinion gears meshing with said spur gears, a carrier for said pinion gears located in the rear of said clutch plate carrier, a pressure plate bearing on but free from positive connection with said movable rear wall of said clutch plate carrier, and clutch operating mechanism including thrust pins carried by said pinion gear carrier arranged to apply pressure on said plate to move said rear wall axially into pressure-applying engagement with said clutch plates.

27. Reversing mechanism including the combination of driving and driven shafts, clutch mechanism connecting said shafts for forward drive including a clutch plate carrier having spaced front and rear walls, said front wall having a driving connection with said driving shaft, said rear wall having a driving connection with said front wall and being axially movable while maintaining said driving connection, cooperative sets of clutch plates having driving connections respectively with said clutch plate carrier and with said driven shaft, planetary gearing connecting said shafts for reverse drive including a spur gear connected with said movable rear wall, a second spur gear connected with said driven shaft, planetary pinion gears meshing with said spur gears, a rotatable carrier for said pinion gears located in the rear of said clutch plate carrier, and clutch operating mechanism carried by said pinion gear carrier having an axially movable member which is movable into engagement with and is free from positive connection with said movable rear wall to move said rear wall into pressure-applying relation with said clutch plates.

28. Reversing mechanism including the combination of driving and driven shafts, planetary gearing connecting said shafts for reverse drive, and clutch mechanism connecting said shafts for forward drive including a clutch plate carrier driven by said driving shaft having axially spaced front and rear walls, said front wall having a driving connection with said driving shaft and said rear wall having a driving connection with said front wall by which both rotate together, said rear wall being movable axially while maintaining said driving connection, clutch plates located between said walls some of which have a driving connection therewith and others of which have a driving connection with said driven shaft, and means to move said rear wall toward said front wall to press said clutch plates against said front wall including means which exerts a pressure axially on said front wall in opposition to the pressure of the clutch plates thereon.

29. Reversing mechanism having the combination of driving and driven shafts, gearing connecting said shafts for reverse drive, power-transmitting clutch mechanism connecting said shafts through said gearing for forward drive, other power-transmitting clutch mechanism connecting said shafts directly for forward drive and excluding said gearing, and means to condition both clutch mechanisms together for forward drive.

30. In a reversing mechanism, driving and driven shafts, gearing connecting said shafts for reverse drive, and means providing two power-transmitting driving connections between said shafts, one including and the other excluding said gearing.

In testimony whereof, I have signed my name to this specification.

HENRY A. TUTTLE.